United States Patent
Nakamura et al.

(10) Patent No.: US 12,307,714 B2
(45) Date of Patent: May 20, 2025

(54) GAZE CALIBRATION SYSTEM

(71) Applicant: SUBARU CORPORATION, Tokyo (JP)

(72) Inventors: Ryota Nakamura, Tokyo (JP); Taiyo Matsuhashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 366 days.

(21) Appl. No.: 17/538,165

(22) Filed: Nov. 30, 2021

(65) Prior Publication Data
US 2022/0207773 A1    Jun. 30, 2022

(30) Foreign Application Priority Data
Dec. 28, 2020    (JP) .................... 2020-218516

(51) Int. Cl.
| | | |
|---|---|---|
| *G06T 7/80* | (2017.01) | |
| *G06F 3/14* | (2006.01) | |
| *G06T 7/70* | (2017.01) | |
| *G06V 20/59* | (2022.01) | |

(52) U.S. Cl.
CPC .............. *G06T 7/80* (2017.01); *G06F 3/1423* (2013.01); *G06T 7/70* (2017.01); *G06V 20/597* (2022.01); *G06T 2207/30201* (2013.01); *G06T 2207/30268* (2013.01)

(58) Field of Classification Search
CPC ................ G02B 27/0093; G02B 27/01; G09G 2320/0693; G09G 2380/10; G06F 3/013; G06F 3/0304; G06F 3/1423; G06T 7/70; G06T 7/80; G06T 2207/30201; G06T 2207/30268; G06V 20/597; G06V 40/19
See application file for complete search history.

(56) References Cited

U.S. PATENT DOCUMENTS

| | | | | |
|---|---|---|---|---|
| 10,712,816 B2* | 7/2020 | Rao | .................. | A61B 3/113 |
| 10,953,811 B2* | 3/2021 | Kim | .................. | B60R 1/26 |
| 11,830,260 B2* | 11/2023 | Nakamura | .................. | G06V 40/50 |
| 2012/0200490 A1* | 8/2012 | Inada | .................. | B60R 11/04 |
| | | | | 345/156 |
| 2012/0215403 A1* | 8/2012 | Tengler | .................. | B60W 50/12 |
| | | | | 701/36 |

(Continued)

FOREIGN PATENT DOCUMENTS

| | | | |
|---|---|---|---|
| JP | 2009-183473 A | 8/2009 | |
| JP | 2019-046240 A | 3/2019 | |

*Primary Examiner* — Katrina R Fujita
(74) *Attorney, Agent, or Firm* — Rimon P.C.

(57) ABSTRACT

A gaze calibration system includes first and second display units, an imaging unit, a display image processor, a calibration data generation processor, and a calibration processor. The first display unit is disposed vehicle-widthwise halfway and vehicle-lengthwise in front of a driver's seat of the vehicle. The second display unit fronts onto the driver's seat. The imaging unit is disposed on an upper portion of the outer periphery of the first display unit. The calibration data generation processor detects, from an image captured by the imaging unit, facial poses and gaze directions with gazes of a driver who drives the vehicle that are directed respectively toward the first and second display units, to generate calibration data. On the basis of the calibration data, the calibration processor makes calibration of the gaze directions.

2 Claims, 13 Drawing Sheets

(56) References Cited

U.S. PATENT DOCUMENTS

| | | | |
|---|---|---|---|
| 2014/0354539 A1* | 12/2014 | Skogo | G06F 3/013 |
| | | | 345/156 |
| 2015/0283904 A1* | 10/2015 | Schlittenbauer | G06F 3/013 |
| | | | 345/173 |
| 2016/0128568 A1* | 5/2016 | Bellamy | A61B 3/005 |
| | | | 351/209 |
| 2016/0196098 A1* | 7/2016 | Roth | G09G 5/00 |
| | | | 715/761 |
| 2016/0342205 A1* | 11/2016 | Shigeta | B60K 35/00 |
| 2017/0364149 A1* | 12/2017 | Lu | G06F 3/013 |
| 2018/0052514 A1* | 2/2018 | Liu | G06V 40/10 |
| 2018/0055353 A1* | 3/2018 | Voelkel | B60W 40/08 |
| 2019/0050664 A1* | 2/2019 | Yang | G06F 3/011 |
| 2019/0147607 A1* | 5/2019 | Stent | G06F 3/012 |
| | | | 382/103 |
| 2019/0156100 A1* | 5/2019 | Rougeaux | G06F 3/013 |
| 2020/0133389 A1* | 4/2020 | Chiu | G06F 3/012 |
| 2020/0319705 A1* | 10/2020 | Rohrbacher | G06F 3/04842 |
| 2021/0334565 A1* | 10/2021 | Roche | B60K 35/29 |

\* cited by examiner

GAZE CALIBRATION SYSTEM

CROSS-REFERENCE TO RELATED APPLICATIONS

This application claims priority from Japanese Patent Application No. 2020-218516 filed on Dec. 28, 2020, the entire contents of which are hereby incorporated by reference.

BACKGROUND

The technology relates to a gaze calibration system.

In recent years, advance has been made in developments of so-called driver monitoring systems (DMS). Driver monitoring systems monitor a driver's state for purposes of assistance with safe driving of vehicles. For example, such a driver monitoring system detects where a driver is gazing at. In a case where the driver is not aware of a current situation, the driver monitoring system gives an alarm to the driver.

This renders it important to detect precisely a gaze direction of the driver, which involves precise calibration processing of the detection of the gaze direction.

SUMMARY

An aspect of the technology provides a gaze calibration system to be applied to a vehicle. The gaze calibration system includes a first display unit, a second display unit, an imaging unit, a display image processor, a calibration data generation processor, and a calibration processor. The first display unit is to be disposed vehicle-widthwise halfway and vehicle-lengthwise in front of a driver's seat of the vehicle. The second display unit is to be disposed so as to front onto the driver's seat. The imaging unit is to be disposed on an upper portion of the outer periphery of the first display unit. The display image processor is configured to control a display image to be displayed on the first display unit and a display image to be displayed on the second display unit. The calibration data generation processor is configured to detect, from an image captured by the imaging unit, a first facial pose and a first gaze direction with a first gaze of a driver seated on the driver's seat, and a second facial pose and a second gaze direction with a second gaze of the driver, to generate calibration data. The first gaze is directed toward the first display unit, and the second gaze is directed toward the second display unit. The calibration processor is configured to make calibration of a gaze direction corresponding to a reference facial pose with the driver's gaze directed toward the first display unit, and a gaze direction corresponding to a reference facial pose with the driver's gaze directed toward the second display unit, on a basis of the calibration data generated in the calibration data generation processor.

An aspect of the technology provides a gaze calibration system to be applied to a vehicle. The gaze calibration system includes a first display unit, a second display unit, an imaging unit, and circuitry. The first display unit is to be disposed vehicle-widthwise halfway and vehicle-lengthwise in front of a driver's seat of the vehicle. The second display unit is to be disposed so as to front onto the driver's seat. The imaging unit is provided on an upper portion of the outer periphery of the first display unit. The circuitry configured to control a display image to be displayed on the first display unit and a display image to be displayed on the second display unit. The circuitry configured to detect, from an image captured by the imaging unit, a first facial pose and a first gaze direction with a first gaze of a driver seated on the driver's seat, and a second facial pose and a second gaze of the driver, to generate calibration data. The first gaze is directed toward the first display unit, and the second gaze is directed toward the second display unit. The circuitry configured to make calibration of a gaze direction corresponding to a reference facial pose with the driver's gaze directed toward the first display unit, and a gaze direction corresponding to a reference facial pose with the driver's gaze directed toward the second display unit, on a basis of the calibration data.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
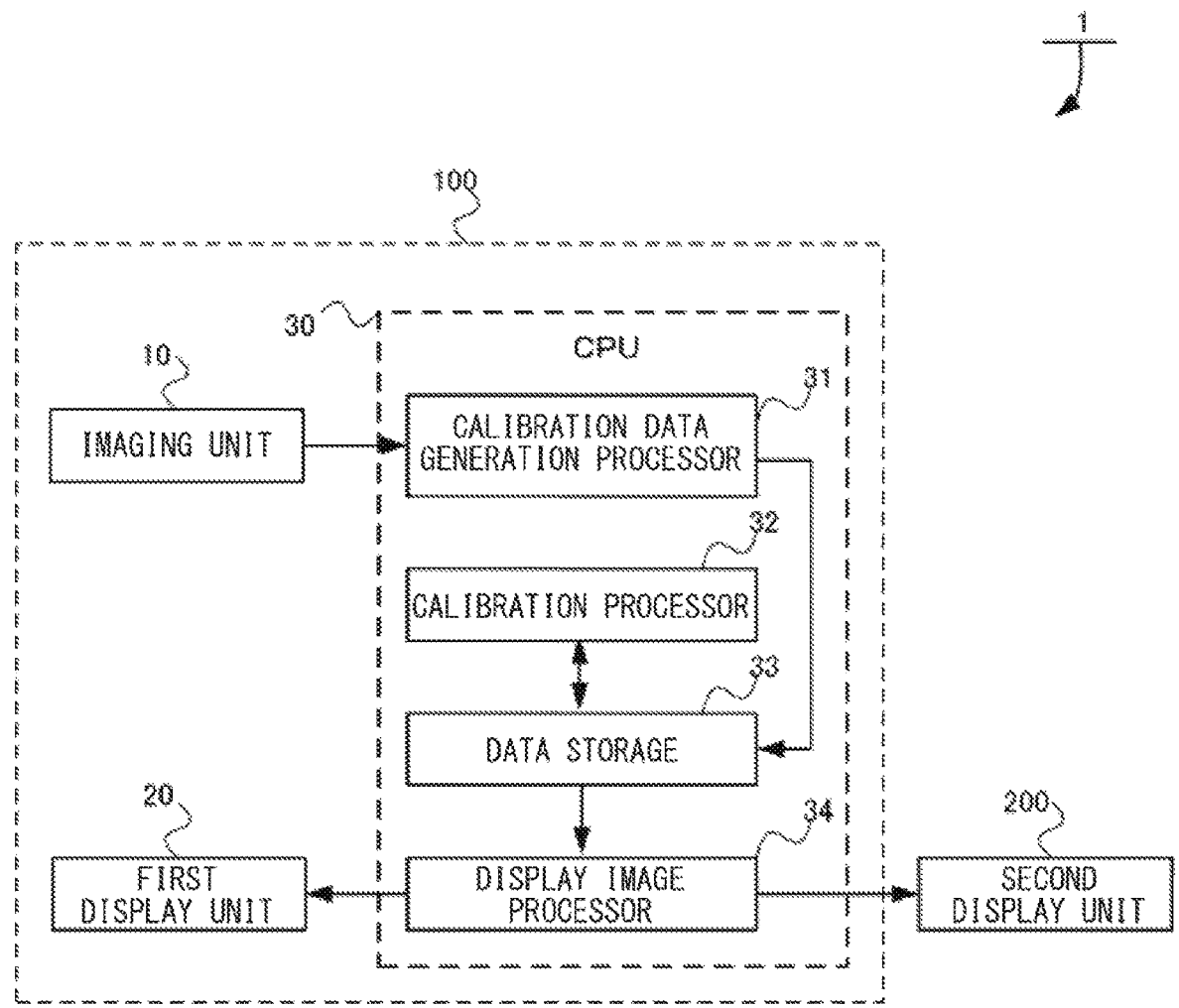
FIG. 1 is a block diagram illustrating a configuration of a gaze calibration system according to an embodiment of the disclosure.

Existing gaze calibration processing as disclosed in Japanese Unexamined Patent Application Publication (JP-A) No. 2009-183473 is carried out on the basis of gaze calibration data obtained with a single target. This causes insufficient precision of gaze calibration in an area off an optical axis of a camera.

Even in a case with a plurality of targets as disclosed in JP-A No. 2019-46240, the precision of wide-area gaze calibration including the area off the optical axis of the camera has been still low because the plurality of the targets is close to one another.

It is desirable to provide a gaze calibration system that makes it possible to enhance precision of gaze calibration in a wide area including an area off an optical axis of a camera.

EMBODIMENTS

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

A gaze calibration system 1 according to an embodiment of the technology is described with reference to FIGS. 1 to 13.

<Configuration of Gaze Calibration System 1>

As illustrated in FIG. 1, the gaze calibration system 1 according to this embodiment may include, without limitation, a driving state monitoring device 100 and a second display unit 200.

Figure 2:
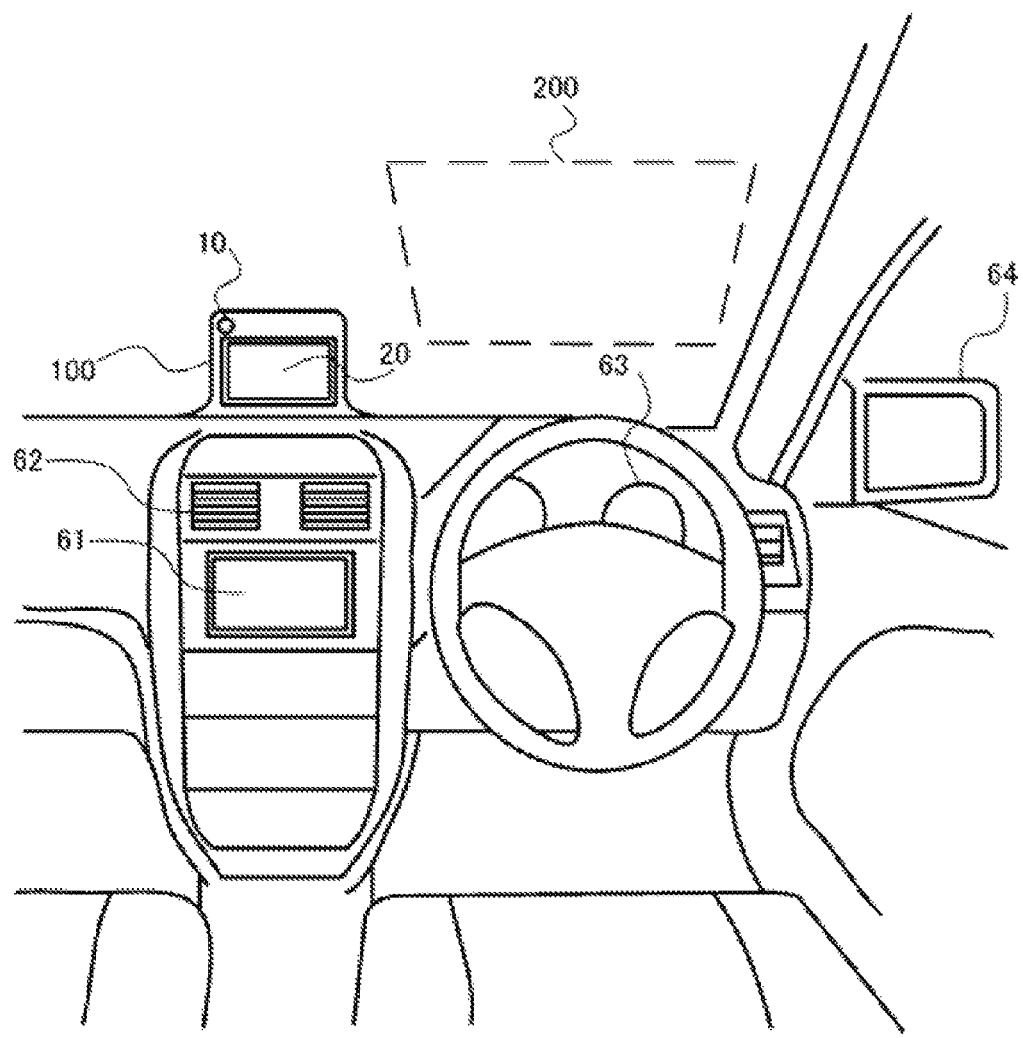
FIG. 2 illustrates an arrangement of a first display unit and a second display unit in the gaze calibration system according to the embodiment of the disclosure.

As illustrated in FIG. 2, the driving state monitoring device 100 may be provided vehicle-widthwise halfway and vehicle-lengthwise in front of a driver's seat. The driving state monitoring device 100 may acquire a facial image of a driver of a vehicle, with an imaging unit 10 described later. The driving state monitoring device 100 may extract a feature point of the facial image acquired. On the basis of a state of the feature point extracted, the driving state monitoring device 100 may monitor a driving state of the driver. Non-limiting example of the state of the feature point may include a facial pose and an opening state of an eye.

It is to be noted that a detailed configuration is described later.

As illustrated in FIG. 2, the second display unit 200 fronts onto the driver's seat. The second display unit 200 may include, for example, a head-up display (HUD) that displays an image of basic data for the driver on a front windshield.

It is to be noted that in the example of FIG. 2, the second display unit 200 may include the HUD that projects an image on the windshield, but the second display unit 200 may include an HUD that projects an image on a combiner provided on a dashboard.

In this embodiment, the second display unit 200 is not limited to an HUD but may include any display unit that displays an image right in front of the driver's seat.

<Configuration of Driving State Monitoring Device 100>

As illustrated in FIG. 1, the driving state monitoring device 100 may include, without limitation, the imaging unit 10, a first display unit 20, and a CPU (Central Processing Unit) 30.

The imaging unit 10 may incorporate an imaging element such as a CCD (Charge Coupled Device) or a CIS (CMOS Image Sensor). The imaging unit 10 may output an image of the driver inside the vehicle captured by the imaging element.

As illustrated in FIG. 2, the imaging unit 10 is provided on an upper portion of the outer periphery of the first display unit 20 described later. The imaging unit 10 may acquire a facial image of the driver.

The imaging unit 10 may include, without limitation, a near-infrared camera or an RGB camera. The imaging unit 10 may receive reflected light of near-infrared light irradiation, to capture the driver's face. The imaging unit 10 may send a captured image signal to the CPU 30 described later.

As illustrated in FIG. 2, the first display unit 20 is provided vehicle-widthwise halfway and vehicle-lengthwise in front of a driver's seat. The first display unit 20 may include, without limitation, a liquid crystal display, and provide the driver with display of data regarding, for example, personal registration.

It is to be noted that the first display unit 20 may also serve as a display unit of a navigation system mounted on the vehicle.

The CPU 30 may include, without limitation, a known, unillustrated CPU, a RAM (Random Access Memory), a ROM (Read Only Memory), and I/O (Input/Output) buses, etc., and execute a control of an entirety of the driving state monitoring device 100 in accordance with a control program held in the ROM.

In this embodiment, for example, the CPU 30 may make a display image control on the first display unit 20 and the second display unit 200. The CPU 30 may detect a facial pose and a gaze direction of the driver from the facial image of the driver inputted from the imaging unit 10. Moreover, the CPU 30 may carry out gaze calibration processing on the basis of data regarding the facial pose and the gaze direction of the driver detected.

It is to be noted that details of a configuration of the CPU 30 are described later.

<Configuration of CPU 30>

As illustrated in FIG. 1, the CPU 30 may include, without limitation, a calibration data generation processor 31, a calibration processor 32, a data storage 33, and a display image processor 34.

The calibration data generation processor 31 may detect, from an image captured by the imaging unit 10, a facial pose and a gaze direction with the direction of the driver with the driver's gaze directed toward the second display unit 200, to generate calibration data.

The calibration data generation processor 31 may detect the facial pose of the driver by analyzing the captured image of the driver by the imaging unit 10.

It is to be noted that a well-known method may be used as a technique of the detection of the facial pose.

Moreover, the calibration data generation processor 31 may detect the gaze direction of the driver by analyzing the captured image of the driver by the imaging unit 10.

Non-limiting examples of a technique of the detection of the gaze direction may include detecting the gaze direction from the facial pose detected. Other examples may include an iris inner eye corner technique and a pupil center corneal reflection technique. The iris inner eye corner technique includes detecting the gaze direction on the basis of a position of a moving point with respect to a reference point, with the reference point set at the inner corner of the eye, and with the moving point set at the center of the iris. The pupil center corneal reflection technique includes detecting the gaze direction on the basis of the position of the moving point with respect to the reference point, with the reference point set at a corneal reflection point (Purkinje image), and with the moving point set at the center of the pupil.

The calibration data generation processor 31 may generate the calibration data, for example, as illustrated in FIGS. 3A, 3B, 4A and 4B.

Figure 3A:
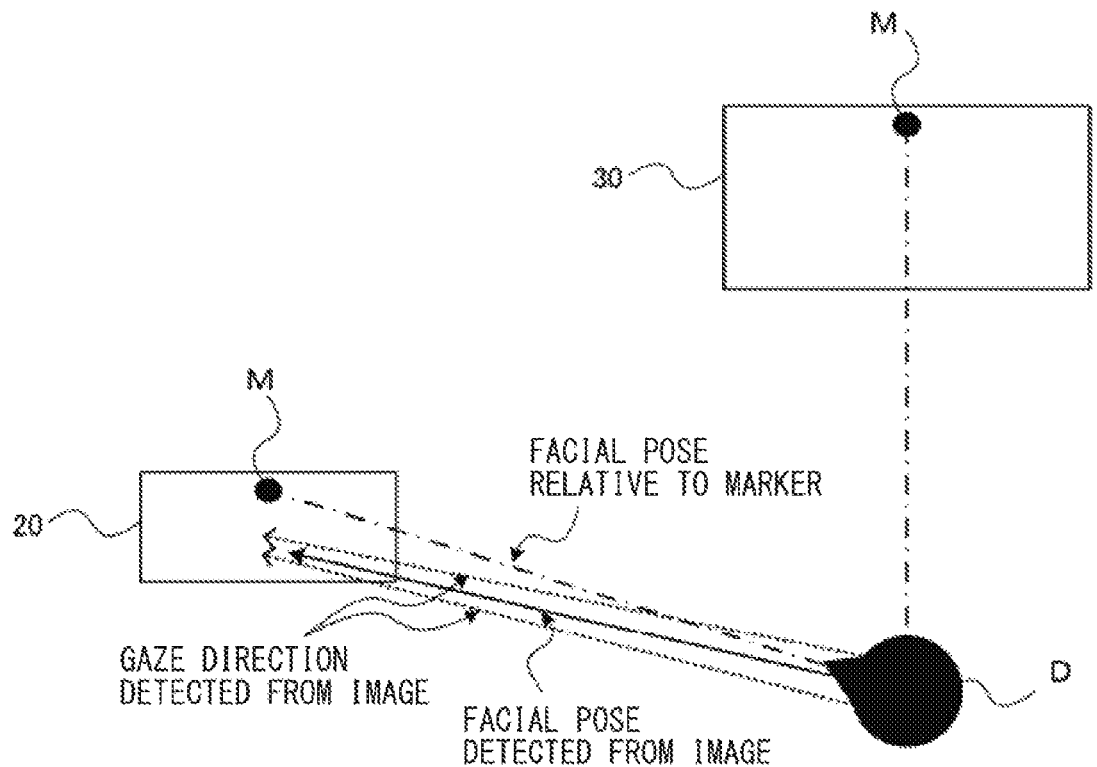
FIGS. 3A and 3B illustrate relation of an actual facial pose of a driver gazing at the first display unit, to a facial pose and a gaze direction of the driver detected from a captured image, in the gaze calibration system according to the embodiment of the disclosure.
Figure 4A:
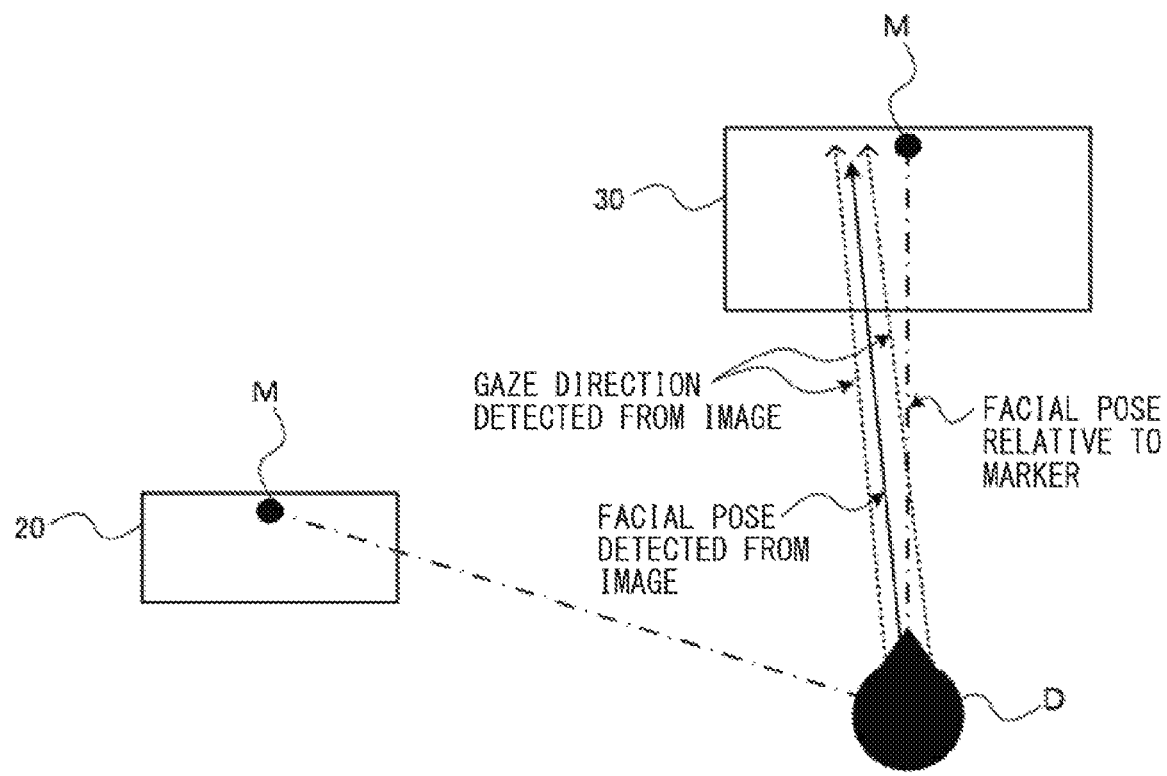
FIGS. 4A and 4B illustrate relation of an actual facial pose of the driver gazing at the second display unit, to a facial pose and a gaze direction of the driver detected from a captured image, in the gaze calibration system according to the embodiment of the disclosure.
Figure 4B:
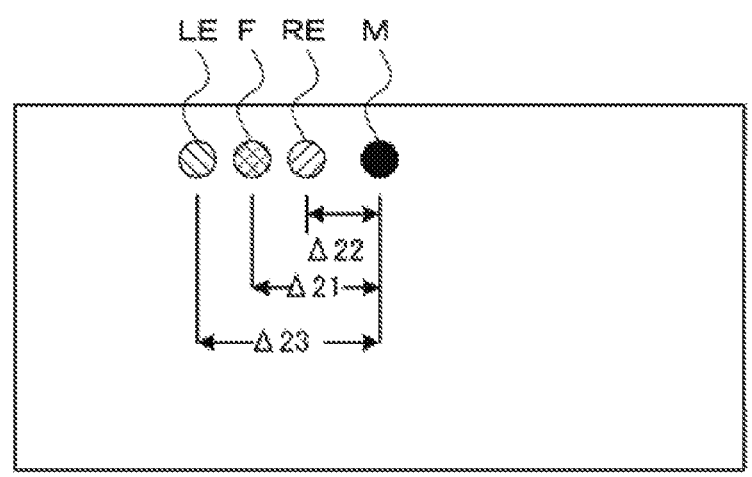

FIGS. 3A and 4A are diagrams, as viewed forward from an oblique direction above the head of the driver. FIG. 3A illustrates a case where the driver gazes at the first display unit 20, and FIG. 4A illustrates a case where the driver gazes at the second display unit 200. The figures include the driver D and markers M. Long dashed short dashed lines denote the facial pose, i.e., an actual facial pose, of the driver D relative to the marker M with a direct gaze at the marker M. Solid lines denote the facial pose of the driver D detected from the image with the driver D's gaze directed toward the marker M. Dotted lines denote the gaze direction of the driver D detected from the image with the driver D's gaze directed toward the marker M.

Figure 3B:
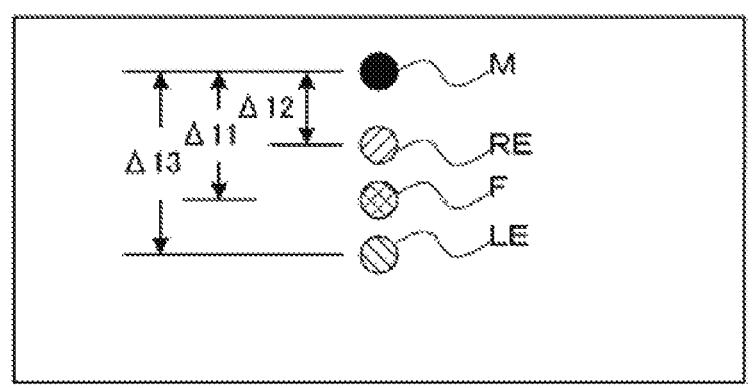

FIG. 3B illustrates an intersection F, a right eye intersection RE, and a left eye intersection LE. The intersection F denotes an intersection of a line (solid line in FIG. 3A) corresponding to the facial pose of the driver D and a display surface of the first display unit 20. The right eye intersection RE and the left eye intersection LE are intersections of lines (dotted lines in FIG. 3A) corresponding to the gaze direction of the driver D at that time and the display surface of the first display unit 20.

In this embodiment, the driver gazes at the first display unit 20 from the oblique direction. Accordingly, the intersection F, the right eye intersection RE, and the left eye intersection LE are arranged in oblique line relative to the marker M. However, for purposes of easier understanding, FIG. 3B illustrates the intersection F, the right eye intersection RE, and the left eye intersection LE in a vertical arrangement relative to the marker M.

Positional data of the intersection F, the right eye intersection RE, and the left eye intersection LE on the display surface may be obtained from coordinates on the display surface of the first display unit 20.

From the positional data, the calibration data generation processor 31 may calculate an error $\Delta 11$ of the facial pose, an error $\Delta 12$ of the right eye, and an error $\Delta 13$ of the left eye with the driver's gaze directed toward the first display unit 20.

Similarly, the calibration data generation processor 31 may calculate an error $\Delta 21$ of the facial pose, an error $\Delta 22$ of the right eye, and an error $\Delta 23$ of the left eye with the driver's gaze directed toward the second display unit 200.

From error data as mentioned above, the calibration data generation processor 31 may generate, as the calibration data, a gain of the facial pose and a gain of the gaze direction with the driver D's gaze directed toward the first display unit 20, and a gain of the facial pose and a gain of the gaze direction with the driver D's gaze directed toward the second display unit 200.

The calibration data generated in the calibration data generation processor 31 may be stored and held in the data storage 33 described later.

The calibration processor 32 is configured to make calibration of a gaze direction corresponding to a reference facial pose with the driver D's gaze directed toward the first display unit 20, and a gaze direction corresponding to a reference facial pose with the driver D's gaze directed toward the second display unit 200, on the basis of the calibration data generated in the calibration data generation processor 31.

The calibration processor 32 may make the calibration at timing when a predetermined amount of the calibration data is held in the data storage 33 described later.

The data storage 33 may hold the calibration data generated in the calibration data generation processor 31.

The data storage 33 may further hold display data to be used in the display image processor 34 described later.

The display image processor 34 is configured to control a display image to be displayed on the first display unit 20 and a display image to be displayed on the second display unit 200.

The display image processor 34 may display, for example, a personal registration screen on the first display unit 20.

Moreover, for example, after acquisition by the CPU 30 of the facial image of the driver D for the personal registration of the driver D, the display image processor 34 may display an image on the second display unit 200, on the basis of a control signal from the CPU 30.

The display image processor 34 may display a moving image on the second display unit 200.

In one example, the moving image may uniquely fix an action of the driver D. Non-limiting examples of the moving image may include a sequential moving image in which a marker to be gazed at by the driver D is displayed while making successive transitions.

Moving images illustrated in FIGS. 5A to 9 exemplify the sequential moving image in which the marker to be gazed at by the driver D is displayed while making the successive transitions.

Figure 5A:
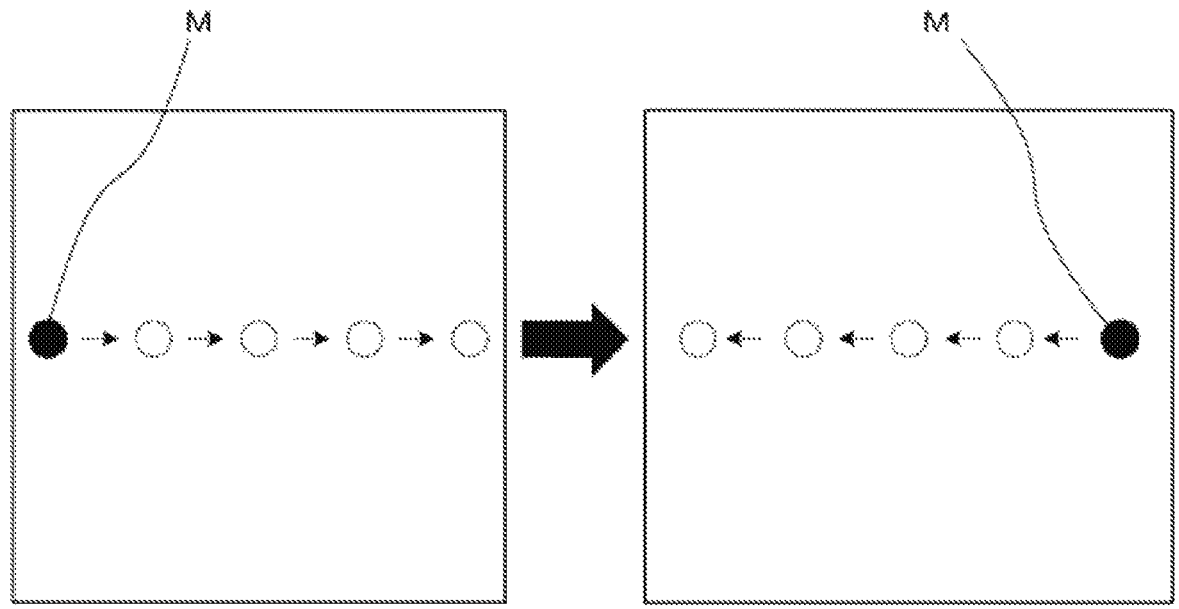
FIGS. 5A and 5B illustrate examples of moving images to be displayed on the second display unit in the gaze calibration system according to the embodiment of the disclosure.
Figure 5B:
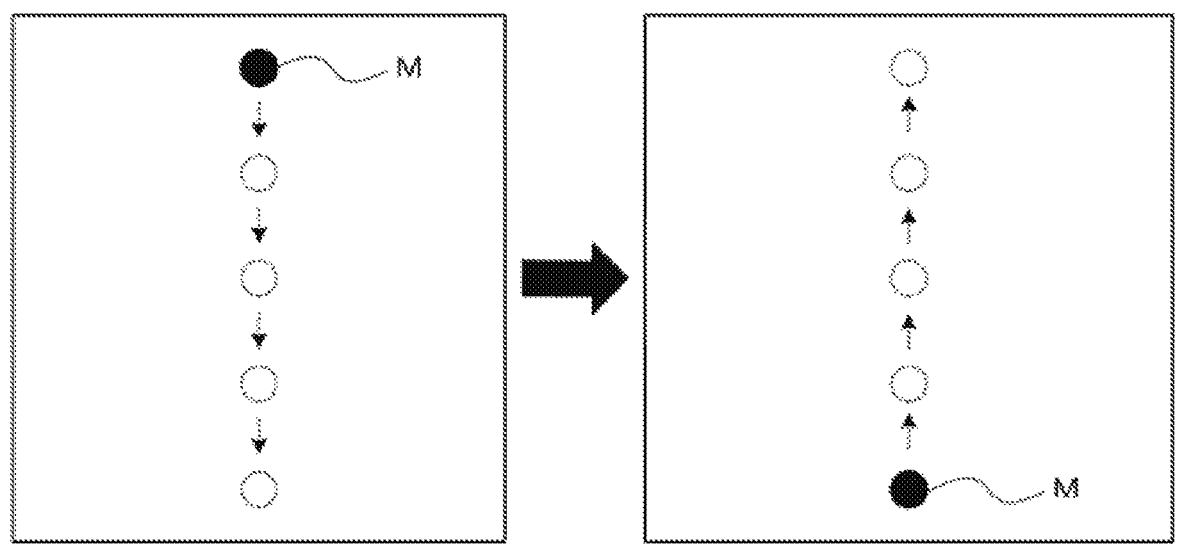

For example, FIG. 5A illustrates a moving image including a single lateral line along which the marker M is displayed while making alternate rightward and leftward successive transitions between a right end and a left end. That is, the marker M makes the rightward successive transitions from the left end to the right end, changes directions, and makes the leftward successive transitions from the right end to the left end. FIG. 5B illustrates a moving image including a single vertical line along which the marker M is displayed while making alternate downward and upward successive transitions between an upper end and a lower end. That is, the marker M makes the downward successive transitions from the upper end to the lower end, changes directions, and makes the upward successive transitions from the lower end to the upper end.

Figure 6A:
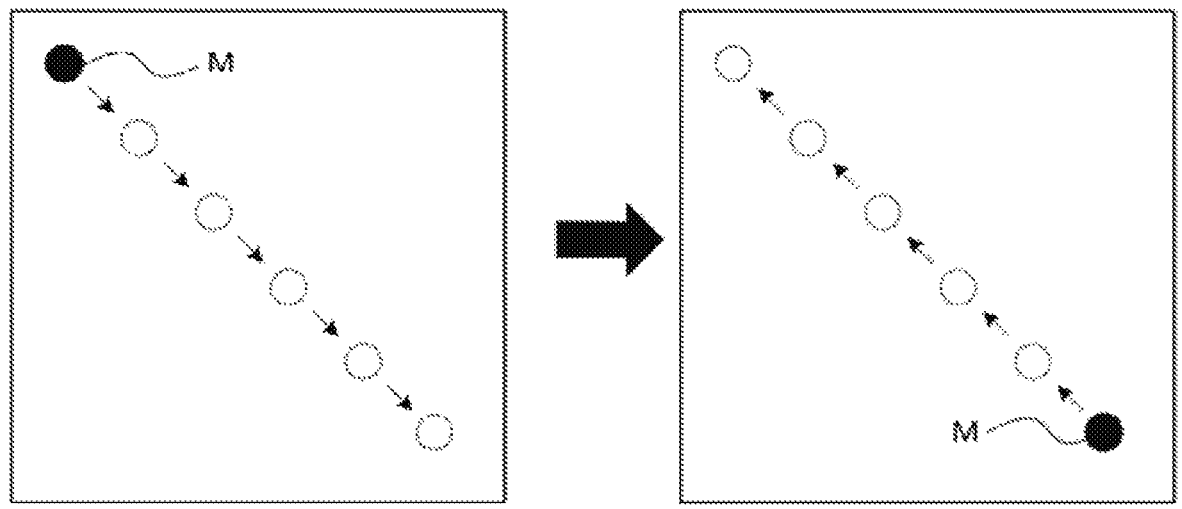
FIGS. 6A and 6B illustrate examples of moving images to be displayed on the second display unit in the gaze calibration system according to the embodiment of the disclosure.
Figure 6B:
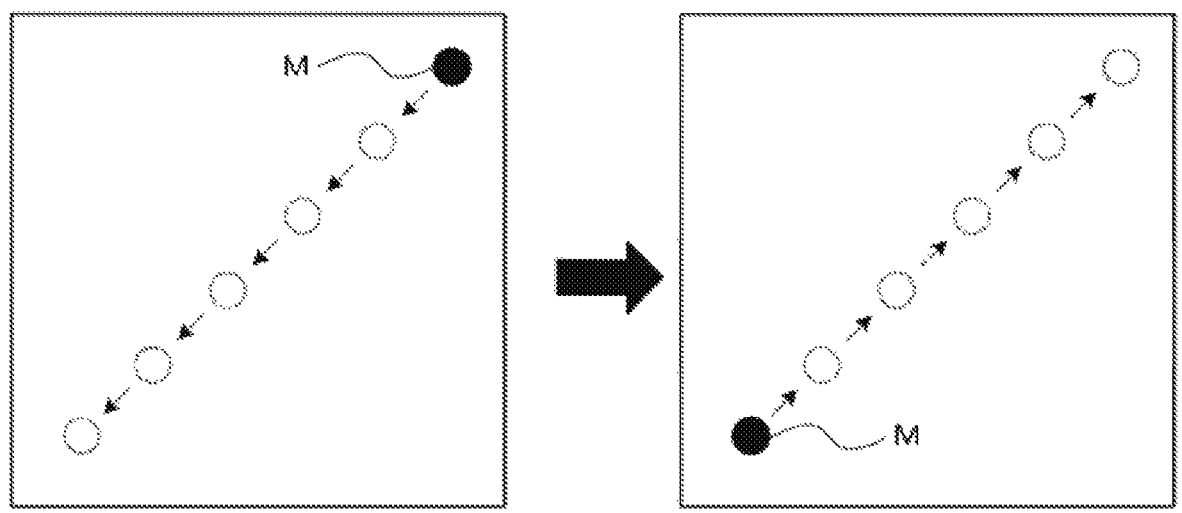

For example, FIG. 6A illustrates a moving image including a single oblique line along which the marker M is displayed while making alternate oblique rightward-downward and leftward-upward successive transitions between an upper left end and a lower right end. That is, the marker M makes the rightward-downward successive transitions from the upper left end to the lower right end, changes directions, and makes the leftward-upward successive transitions from the lower right end to the upper left end. FIG. 6B illustrates a moving image including a single oblique line along which the marker M is displayed while making alternate oblique leftward-downward and rightward-upward successive transitions between an upper right end and a lower left end. That is, the marker M makes the leftward-downward successive transitions from the upper right end to the lower left end, changes directions, and makes the rightward-upward successive transitions from the lower left end to the upper right end.

Figure 7A:
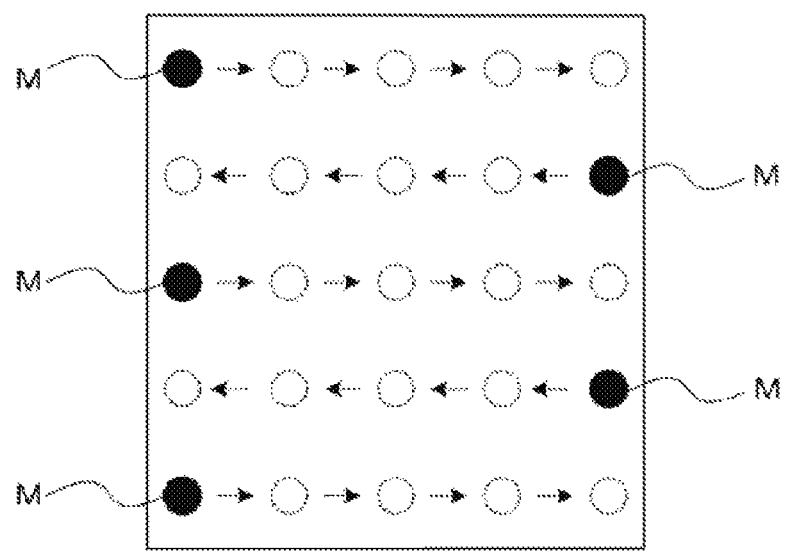
FIGS. 7A and 7B illustrate examples of moving images to be displayed on the second display unit in the gaze calibration system according to the embodiment of the disclosure.
Figure 7B:
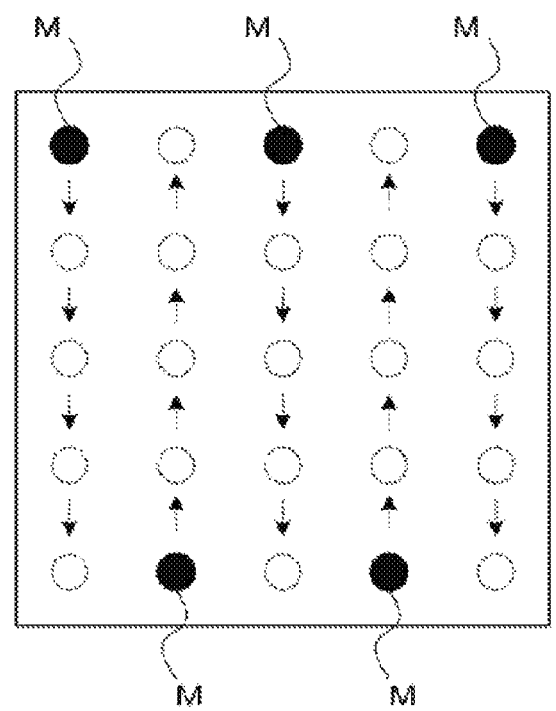

For example, FIG. 7A illustrates a moving image including a plurality of lateral lines along which the marker M is displayed while making alternate, repetitive rightward and leftward successive transitions. That is, the marker M makes the rightward successive transitions from the left end to the right end, moves to a lower row, changes directions, and makes the leftward successive transitions from the right end to the left end. FIG. 7B illustrates a moving image including a plurality of vertical lines along which the marker M is displayed while making alternate, repetitive downward and upward successive transitions. That is, the marker M makes the downward successive transitions from the upper end to the lower end, moves to an adjacent column on the right, changes directions, and makes the upward successive transitions from the lower end to the upper end.

Figure 8:
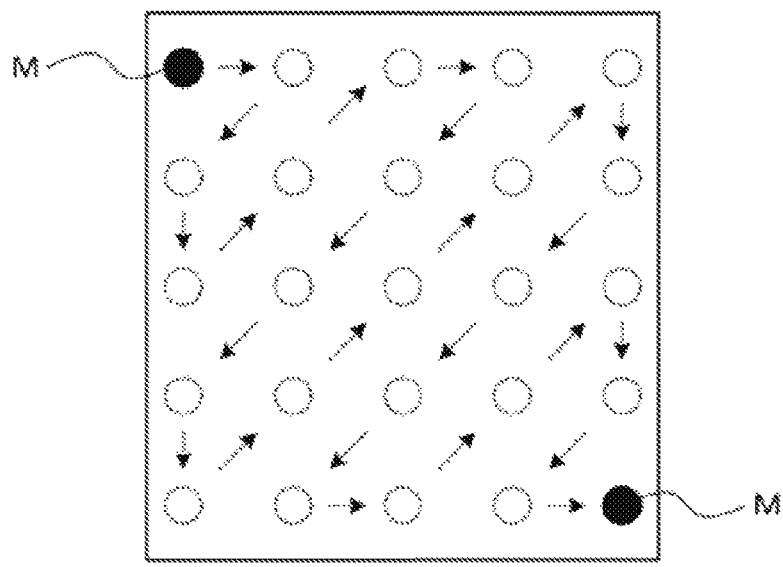
FIG. 8 illustrates an example of a moving image to be displayed on the second display unit in the gaze calibration system according to the embodiment of the disclosure.

For example, FIG. 8 illustrates a moving image including a plurality of vertical lines along which the marker M makes alternate oblique rightward-downward and leftward-upward successive transitions from the upper left corner to the lower right corner. It is to be noted that a direction of the transitions may be set as follows: from the lower right corner to the upper left corner; from the lower left corner to the upper right corner; from the upper right corner to the lower left corner; from the upper left corner to the lower right corner; from the lower left corner to the upper left corner; from the upper right corner to the lower right corner; or from the lower right corner to the upper right corner.

Figure 9:
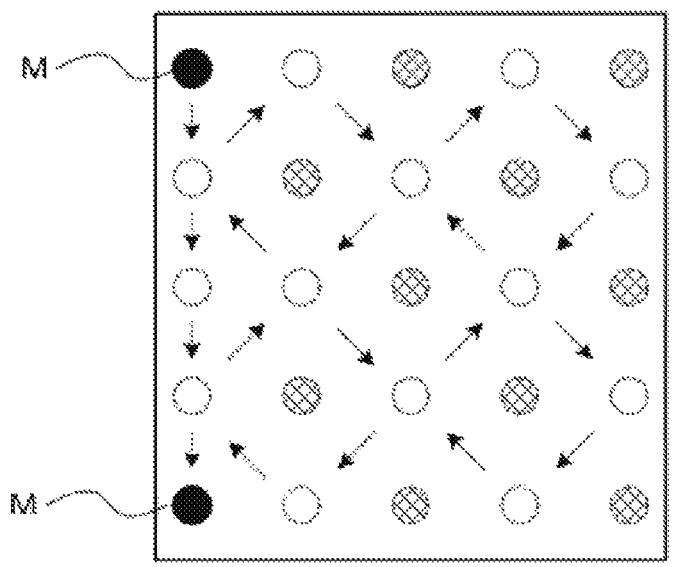
FIG. 9 illustrates an example of a moving image to be displayed on the second display unit in the gaze calibration system according to the embodiment of the disclosure.

For example, FIG. 9 illustrates a moving image including a plurality of vertical lines along which the marker M makes zigzag successive transitions from the upper left corner to the lower left corner. It is to be noted that a direction of the transitions may be set as follows: from the lower left corner to the upper left corner; from the upper right corner to the lower right corner; from the upper left corner to the lower right corner; from the upper left corner to the upper right corner; from the upper right corner to the lower right corner; from the lower right corner to the lower left corner; or from the lower right corner to the upper right corner.

<Processing in Gaze Calibration System 1>

Description is given of processing in the gaze calibration system 1 according to this embodiment with reference to FIGS. 10 to 13.

<Main Processing in Gaze Calibration System 1>

Figure 10:
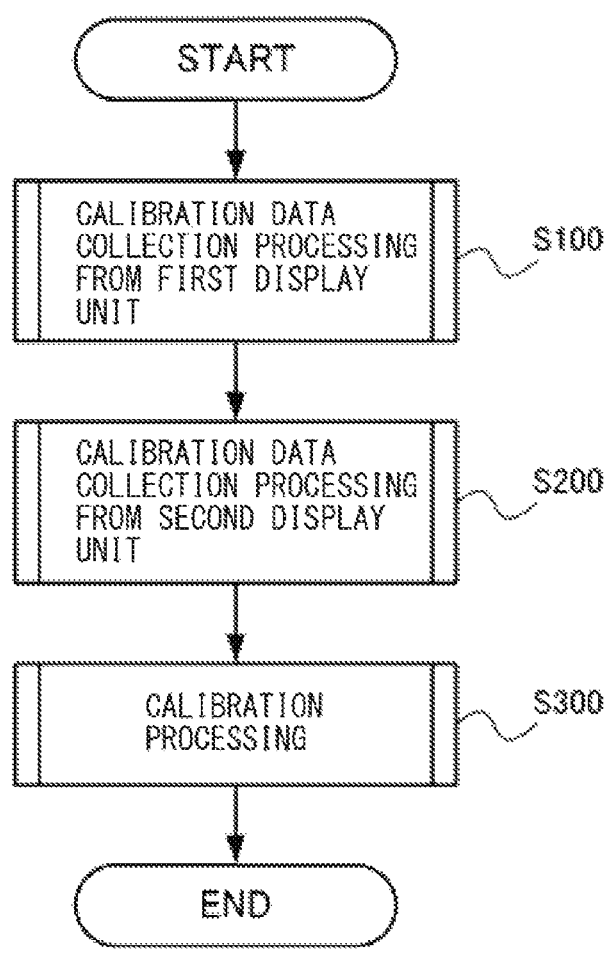
FIG. 10 is a flowchart of main processing in the gaze calibration system according to the embodiment of the disclosure.

As illustrated in FIG. 10, main processing in the gaze calibration system 1 may include, without limitation, calibration data collection processing from the first display unit 20 (step S100), calibration data collection processing from the second display unit 200 (step S200), and calibration processing (step S300).

In the following, each processing step is described in detail.

<Calibration Data Collection Processing from First Display Unit 20>

Figure 11:
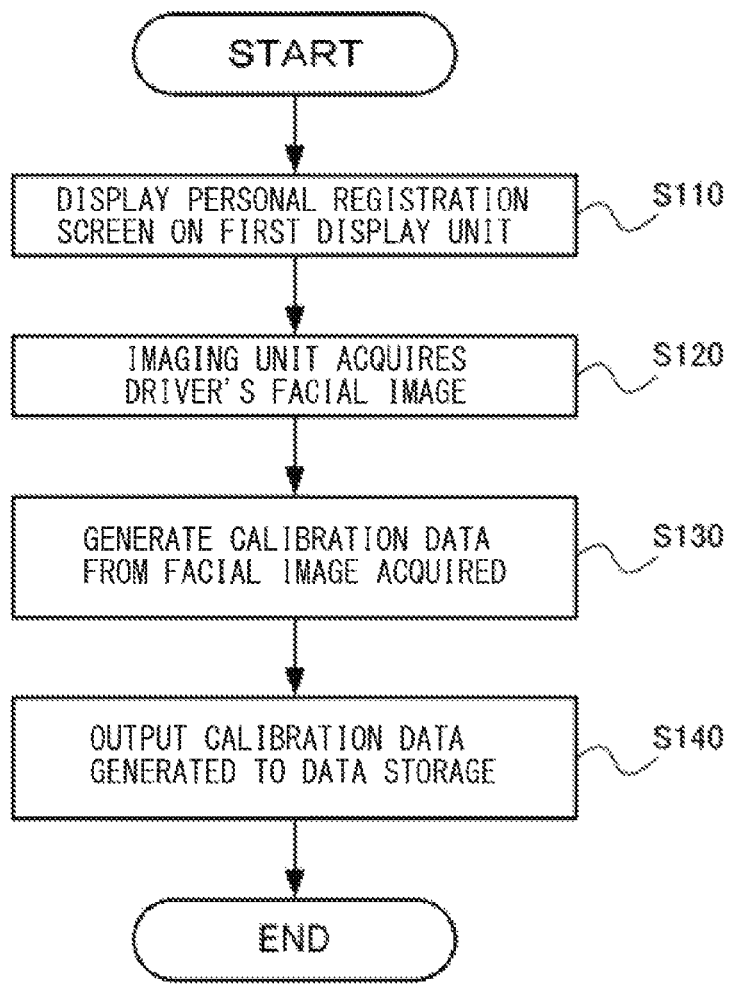
FIG. 11 is a flowchart of data collection processing in the first display unit in the gaze calibration system according to the embodiment of the disclosure.

With reference to FIG. 11, described is the calibration data collection processing from the first display unit 20.

First, on the basis of the control signal from the CPU 30, the display image processor 34 may display, on the first display unit 20, the personal registration screen for the utilization of the driving state monitoring device 100 (step S110).

At this occasion, the imaging unit 10 may capture the facial image of the driver D on the basis of the control signal from the CPU 30 (step S120).

Upon completion of the imaging, the imaging unit 10 may output facial image data of the driver D to the calibration data generation processor 31.

The calibration data generation processor 31 may extract the facial pose and the gaze direction of the driver D from the facial image data of the driver D inputted.

Thereafter, on the basis of the facial pose and the gaze direction of the driver D thus extracted, and on the basis of the facial pose with the driver D's gaze directed toward the marker M, the calibration data generation processor 31 may calculate the error $\Delta 11$ of the facial pose, the error $\Delta 12$ of the right eye, and the error $\Delta 13$ of the left eye with the driver D's gaze directed toward the first display unit 20.

Furthermore, the calibration data generation processor 31 may generate, from the error data as mentioned above, the gain of the facial pose and the gain of the gaze direction with the driver D's gaze directed toward the first display unit 20, as the calibration data (step S130).

Thereafter, the calibration data generated in the calibration data generation processor 31 may be stored and held in the data storage 33 (step S140).

<Calibration Data Collection Processing from Second Display Unit 200>

Figure 12:
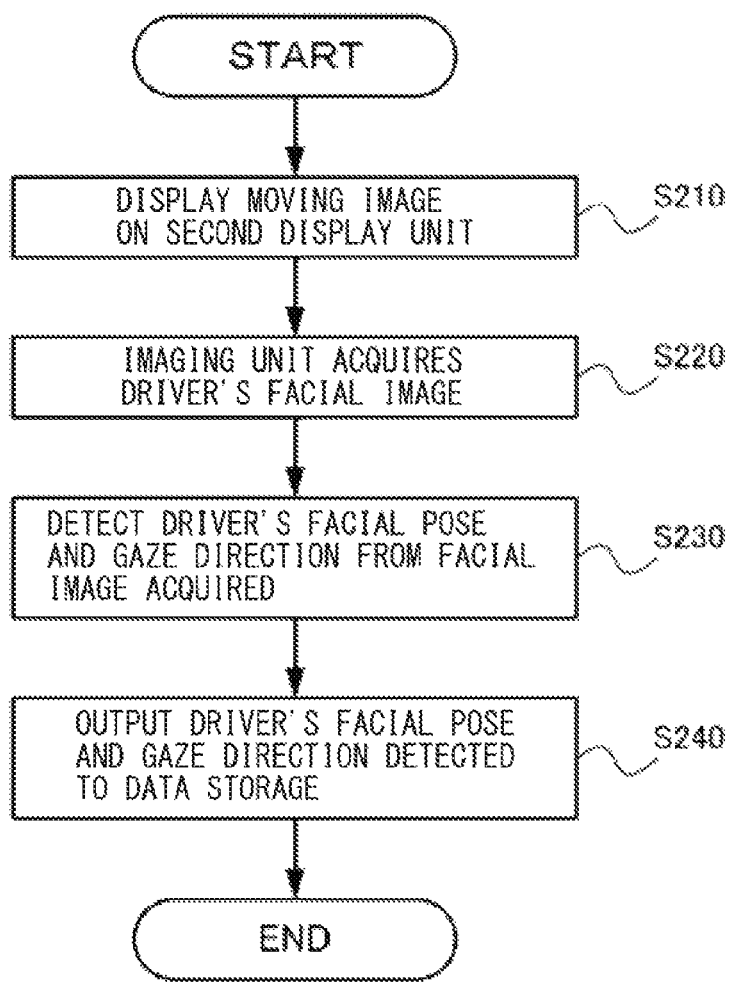
FIG. 12 is a flowchart of data collection processing in the second display unit in the gaze calibration system according to the embodiment of the disclosure.

With reference to FIG. 12, described is the calibration data collection processing from the second display unit 200.

First, on the basis of the control signal from the CPU 30, the display image processor 34 may display the moving image on the second display unit 200 at timing when the facial image of the driver D gazing at the first display unit 20 is captured (step S210).

Non-limiting examples of the moving image to be displayed on the second display unit 200 may include the sequential moving images as illustrated in FIGS. 5A to 9 in which the marker to be gazed at by the driver D is displayed while making the successive transitions.

At this occasion, on the basis of the control signal from the CPU 30, the imaging unit 10 may capture the facial image of the driver D gazing at the moving image displayed on the second display unit 200 (step S220).

Upon completion of the imaging, the imaging unit 10 may output facial image data of the driver D to the calibration data generation processor 31.

The calibration data generation processor 31 may extract the facial pose and the gaze direction of the driver D from the facial image data of the driver D inputted.

Thereafter, on the basis of the facial pose and the gaze direction of the driver D thus extracted, and on the basis of the facial pose of the driver D with the driver D's gaze directed toward the marker M, the calibration data generation processor 31 may calculate the error $\Delta 21$ of the facial pose, the error $\Delta 22$ of the right eye, and the error $\Delta 23$ of the left eye with the driver D's gaze directed toward the second display unit 200.

Furthermore, the calibration data generation processor 31 may generate, from the error data as mentioned above, the gain of the facial pose and the gain of the gaze direction with the driver D's gaze directed toward the second display unit 200, as the calibration data (step S230).

Thereafter, the calibration data generated in the calibration data generation processor 31 may be stored and held in the data storage 33 (step S240).

<Calibration Processing>

Figure 13:
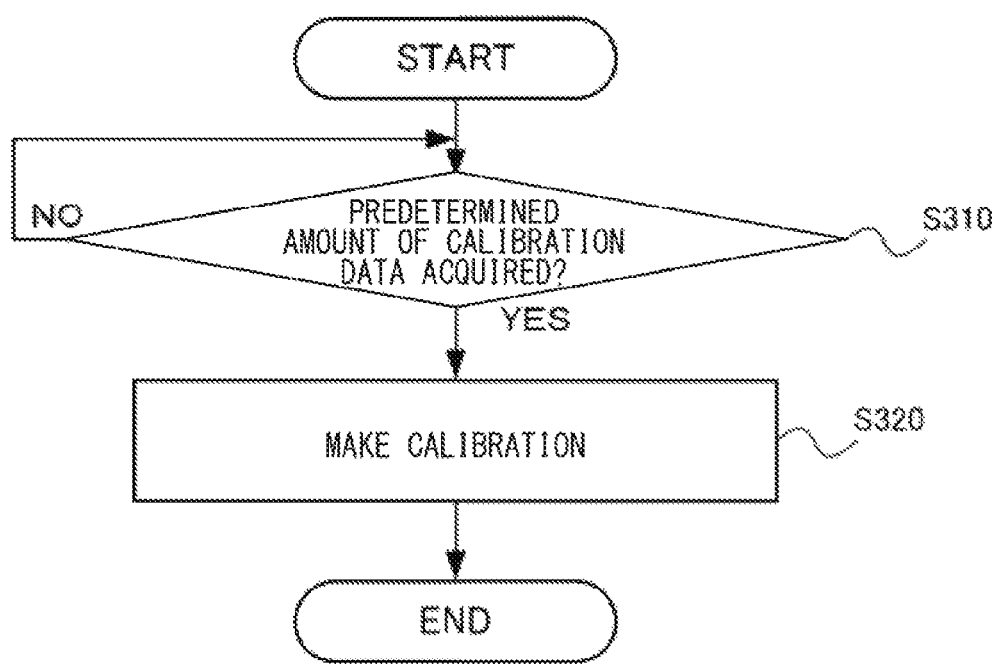
FIG. 13 is a flowchart of calibration processing in the gaze calibration system according to the embodiment of the disclosure.

With reference to FIG. 13, the calibration processing is described.

The CPU 30 may determine whether or not the predetermined amount of the calibration data is held in the data storage 33 (step S310). The predetermined amount may be prescribed in advance.

In a case where the CPU 30 determines that the predetermined amount of the calibration data is not held in the data storage 33 ("NO" in step S310), the CPU 30 may shift to a standby mode.

In a case where the CPU 30 determines that the predetermined amount of the calibration data is held in the data storage 33 ("YES" in step S310), the CPU 30 may cause the flow to proceed to step S320.

At this occasion, on the basis of the calibration data generated in the calibration data generation processor 31, the calibration processor 32 makes the calibration of the gaze direction corresponding to the reference facial pose with the driver D's gaze directed toward the first display unit 20, and the gaze direction corresponding to the reference facial pose with the driver D's gaze directed toward the second display unit 200 (step S320).

<Workings and Effects>

As described above, the gaze calibration system 1 according to this embodiment includes the first display unit 20, the second display unit 200, the imaging unit 10, the display image processor 34, the calibration data generation processor 31, and the calibration processor 32. The first display unit 20 is provided vehicle-widthwise halfway and vehicle-lengthwise in front of the driver's seat. The second display unit 200 fronts onto the driver's seat. The imaging unit 10 is provided on the upper portion of the outer periphery of the first display unit 20. The display image processor 34 is configured to control the display image to be displayed on the first display unit 20 and the display image to be displayed on the second display unit 200. The calibration data generation processor 31 is configured to detect, from the image captured by the imaging unit 10, the facial pose and the gaze direction with the driver D's gaze directed toward the first display unit 20, and the facial pose and the gaze direction with the driver D's gaze directed toward the second display unit 200, to generate the calibration data. The calibration processor 32 is configured to make the calibration of the gaze direction corresponding to the reference facial pose with the driver D's gaze directed toward the first display unit 20, and the gaze direction corresponding to the reference facial pose with the driver D's gaze directed toward the second display unit 200.

That is, the gaze calibration system 1 according to this embodiment is configured to make gaze calibration with respect to the first display unit 20 and the second display unit 200. The first display unit 20 is provided vehicle-widthwise halfway and vehicle-lengthwise in front of the driver's seat. The second display unit 200 fronts onto the driver's seat.

In general, calibration made with the use of an image captured in the vicinity of an optical axis of the imaging unit (calibration with the first display unit 20) has high precision, while calibration made with the use of an image captured off the optical axis of the imaging unit 10 (calibration with the second display unit 200) is known to have low precision.

In the gaze calibration system 1 according to this embodiment, however, the calibration with the driver D's gaze directed toward the first display unit 20 is made on the basis of the calibration data with the driver D's gaze directed toward the first display unit 20. The calibration with the driver D's gaze directed toward the second display unit 200 is made on the basis of the calibration data with the driver D's gaze directed toward the second display unit 200. Hence, it is possible to enhance the precision of the calibration with the second display unit 200.

That is, acquiring the calibration data in a case with a small difference between the facial pose of the driver D and the optical axis of the imaging unit 10, and acquiring the calibration data in a case with a large difference between the facial pose of the driver D and the optical axis of the imaging unit 10 make it possible to enhance the precision of the gaze calibration in a wide area including an area off the optical axis of the imaging unit 10.

In one example, referring to FIG. 2, in a case with the driver D's gaze directed toward an air conditioner 62 or a navigation system 61, the calibration data acquired with respect to the first display unit 20 is used. In a case with the driver D's gaze directed toward an instrument panel 63 or an outside rear view mirror 64, the calibration data acquired with respect to the second display unit 200 is used. This makes it possible to enhance the precision of the gaze calibration in the wide area including the area off the optical axis of the imaging unit 10.

Moreover, the gaze calibration system 1 according to this embodiment may include the driving state monitoring device 100. The driving state monitoring device 100 may include the first display unit 20, the imaging unit 10, the display image processor 34, the calibration data generation processor 31, and the calibration processor 32. With the use of the driving state monitoring device 100, after the acquisition of the facial image of the driver D for the personal registration of the driver D, the display image processor 34 may display the image on the second display unit 200.

That is, the acquisition of the calibration data with the first display unit 20 is triggered by the personal registration in the driving state monitoring device 100. After the acquisition of the facial image of the driver D for the personal registration of the driver D, the display image processor 34 may display the image on the second display unit 200, to acquire the calibration data.

Hence, it is possible to reduce a burden on the driver D, and to shorten time for the acquisition of the calibration data.

Furthermore, in the gaze calibration system 1 according to this embodiment, the display image processor 34 may display the moving image on the second display unit 200.

That is, displaying the moving image on the second display unit 200 makes it possible to determine uniquely the action of the driver D. Hence, it is possible to shorten time for acquisition of gaze data useful for the gaze calibration.

In addition, displaying the moving image on the second display unit 200 makes it possible to determine uniquely the action of the driver D. Hence, it is possible to enhance precision of the calibration data.

Moreover, in the gaze calibration system 1 according to this embodiment, the display image processor 34 may display, over an entire screen of the second display unit 200, the sequential moving image in which the marker to be gazed at by the driver D is displayed while making the successive transitions.

In one example, the display image processor 34 may display, over the entire screen of the second display unit 200, the sequential moving image as illustrated in FIGS. 5A to 9.

This makes it possible to easily guide the gaze of the driver D, and to suppress variations in the action of the driver D. Hence, it is possible to shorten time until the acquisition of the gaze data useful for the gaze calibration.

Furthermore, in the gaze calibration system 1 according to this embodiment, the calibration processor 32 may make the calibration at the timing when the predetermined amount of the calibration data is held in the data storage 33.

That is, the calibration processor 32 may make the calibration at the timing when the calibration data sufficient for the calibration processing is held in the data storage 33. Hence, it is possible to enhance the precision of the gaze calibration processing.

In addition, in the gaze calibration system 1 according to this embodiment, the second display unit 200 may include the head-up display.

That is, it is possible to make the gaze calibration with the use of the driving state monitoring device 100 mounted on the vehicle and the head-up display. Hence, it is possible to easily make the gaze calibration without involving extra devices.

Moreover, the second display unit 200 may include the head-up display having a large display region. This makes it possible to obtain the sufficient calibration data although the second display unit 200 is located off the optical axis of the imaging unit 10 and generally considered to have low precision. Hence, it is possible to enhance the precision of the calibration.

Modification Example 1

For example, in the forgoing embodiments, the configuration is described in which the CPU 30 includes the calibration data generation processor 31, the calibration processor 32, and the data storage 33. However, an alternative configuration may be possible in which image data, etc., captured in the imaging unit 10 is transferred to a server coupled to the vehicle through a network, to allow the server to carry out the processing by the calibration data generation processor 31 and the processing by the calibration processor 32.

This makes it possible to process many pieces of data quickly.

Modification Example 2

Although not mentioned in the forgoing embodiments, the moving image may be also displayed on the first display unit 20.

In one example, the moving image as illustrated in FIG. 5A or 5B may be displayed on a top page of the personal registration. Alternatively, an additional page may be provided between the top page and the next page of the personal registration. The additional page may display the moving image as illustrated in FIGS. 6A to 9 together with a message.

Figure 14:
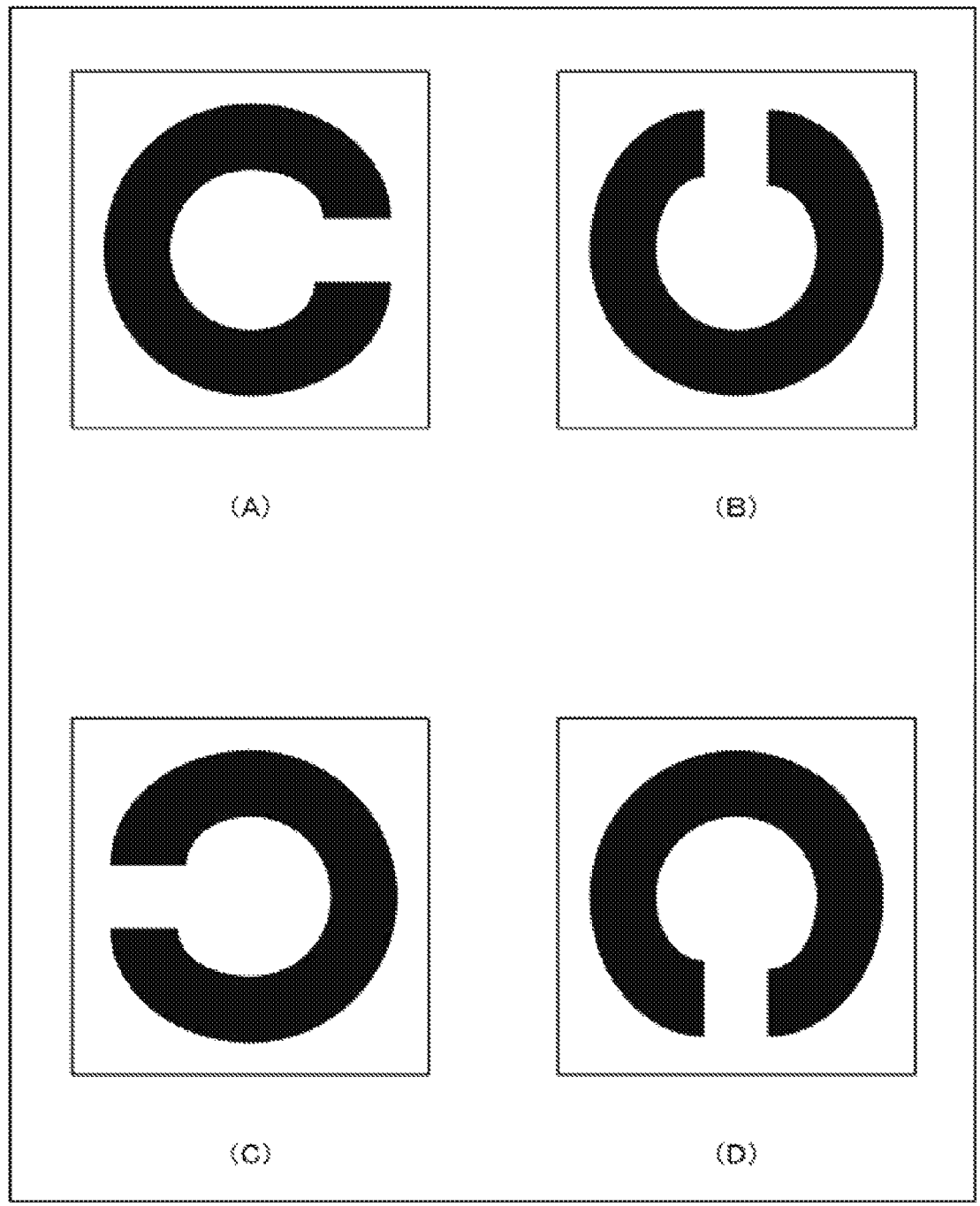
FIG. 14 illustrates an example of an image to be displayed on the first display unit, according to a modification example of the disclosure.

In another alternative, an image as illustrated in FIG. 14 may be displayed between the top page and the next page of the personal registration together with a message saying, "Please gaze at the gaps in the rings in the order of (A) to (D)".

Thus, displaying a moving image or a still image on the first display unit 20 makes it possible to determine uniquely the gaze of the driver D. Hence, it is possible to enhance the precision of the calibration data to be obtained with the driver D's gaze directed toward the first display unit 20.

The gaze calibration system 1 of the example embodiments of the disclosure may be realized by recording the processing by the calibration data generation processor 31, the calibration processor 32, and the display image processor 34 in a recording medium readable by a computer system, and by causing the calibration data generation processor 31, the calibration processor 32, and the display image processor 34 to read and execute a program held in the recording medium. A computer system as used herein includes an operating system and hardware such as peripheral devices.

In the case with the use of the WWW (World Wide Web) system, the "computer system" also includes an environment that provides and/or displays a website. The program may be transmitted from the computer system in which the program is held in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the processing described above.

In addition, the program may be a so-called differential file, or a differential program, that is able to realize the processing described above by a combination with a program already held in the computer system.

Although some example embodiments of the technology have been described in the forgoing byway of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

Each of the calibration data generation processor 31, the calibration processor 32, and the display image processor 34 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the calibration data generation processor 31, the calibration processor 32, and the display image processor 34 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the calibration data generation processor 31, the calibration processor 32, and the display image processor 34 illustrated in FIG. 1.

The invention claimed is:

1. A gaze calibration system to be applied to a vehicle, the gaze calibration system comprising:

a first display unit disposed at a center in a widthwise direction of the vehicle and in front of a driver's seat of the vehicle;

a second display unit disposed directly facing the driver's seat, wherein the second display unit is a head-up display;

a camera disposed on an upper portion of an outer periphery of the first display unit and configured to capture an image of a driver seated on the driver's seat, the image including a face of the driver; and a processor configured to:
monitor a driving state of the driver based on where the driver gazes, using the image of the driver captured by the camera;
control a display image on the first display unit and a display image on the second display unit;
display, on the first display unit, a personal registration screen for registering the driver as a target for monitoring the driving state;
in response to displaying the personal registration screen on the first display unit, acquire a first facial image of the driver from the image captured by the camera while displaying the personal registration screen on the first display unit, wherein the first facial image of the driver is captured in vicinity of an optical axis of the imaging unit;
in response to acquiring the first facial image, (1) register the driver as the target based on the first facial image and (2) display, across an entire screen of the second display unit, a sequential moving image in which a marker to be gazed at by the driver is displayed while making successive transitions;
in response to displaying the sequential moving image on the second display unit, acquire a second facial image of the driver from the image captured by the camera while displaying the sequential moving image on the second display unit, wherein the second facial image is captured off the optical axis of the imaging unit;
in response to acquiring the second facial image, detect, from the first and second facial images, a first facial pose and a first gaze direction of the driver when the driver gazes at the first display unit, and a second facial pose and a second gaze direction of the driver when the driver gazes at the second display unit, to generate calibration data; and
perform calibration of a gaze direction corresponding to a reference facial pose when the driver gazes at the first display unit, and a gaze direction corresponding to a reference facial pose when the driver gazes at the second display unit, on a basis of the calibration data.

2. A gaze calibration system to be applied to a vehicle, the gaze calibration system, comprising:

a first display unit disposed at a center in a widthwise direction of the vehicle and in front of a driver's seat of the vehicle;

a second display unit disposed directly facing the driver's seat, wherein the second display unit is a head-up display;

a camera disposed on an upper portion of an outer periphery of the first display unit and configured to capture an image of a driver seated on the driver's seat, the image including a face of the driver; and circuitry configured to:
monitor a driving state of the driver based on where the driver gazes, using the image of the driver captured by the camera;
control a display image on the first display unit and a display image on the second display unit;
display, on the first display unit, a personal registration screen for registering the driver as a target for monitoring the driving state;
in response to displaying the personal registration screen on the first display unit, acquire a first facial image of the driver from the image captured by the camera while displaying the personal registration screen on the first display unit, wherein the first facial image of the driver is captured in vicinity of an optical axis of the imaging unit;
in response to acquiring the first facial image, (1) register the driver as the target based on the first facial image and (2) display, across an entire screen of the second display unit, a sequential moving image in which a marker to be gazed at by the driver is displayed while making successive transitions;
in response to displaying the sequential moving image on the second display unit, acquire a second facial image of the driver from the image captured by the camera while displaying the sequential moving image on the second display unit, wherein the second facial image is captured off the optical axis of the imaging unit;
in response to acquiring the second facial image, detect, from the first and second facial images, a first facial pose and a first gaze direction of the driver when the driver gazes at the first display unit, and a second facial pose and a second gaze direction of the driver when the driver gazes at the second display unit, to generate calibration data; and
perform calibration of a gaze direction corresponding to a reference facial pose when the driver gazes at the first display unit, and a gaze direction corresponding to a reference facial pose when the driver gazes at the second display unit, on a basis of the calibration data.

* * * * *